Figure 1:
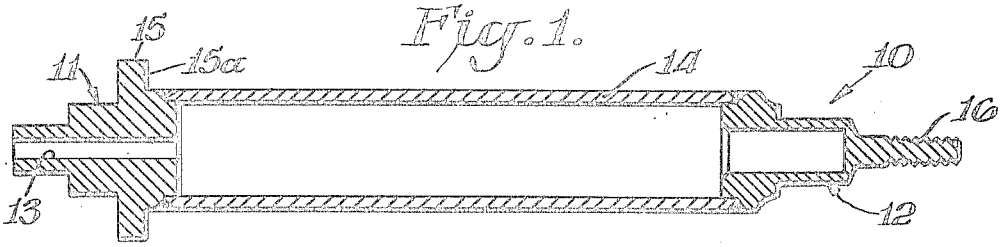
Figure 4:
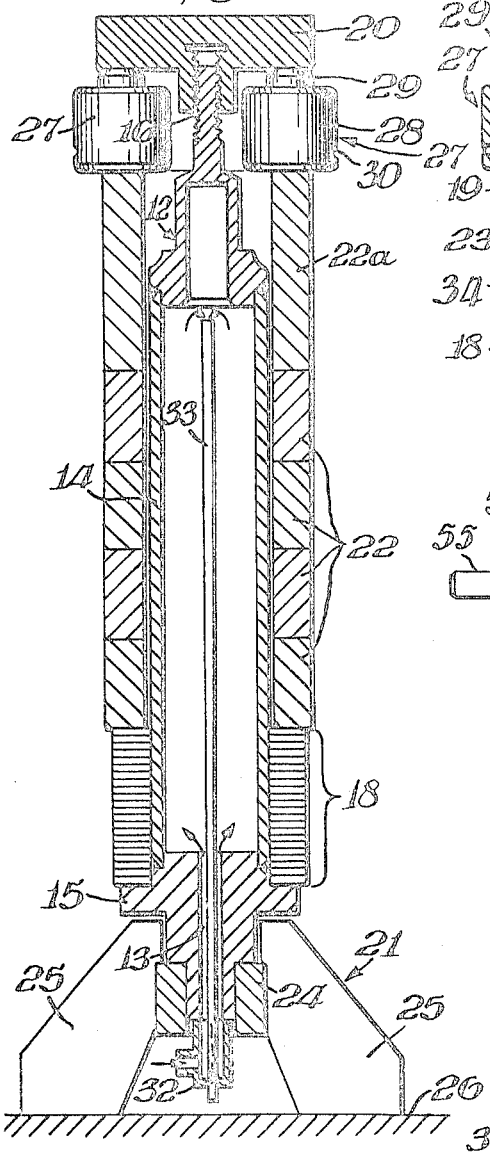
Figure 5:
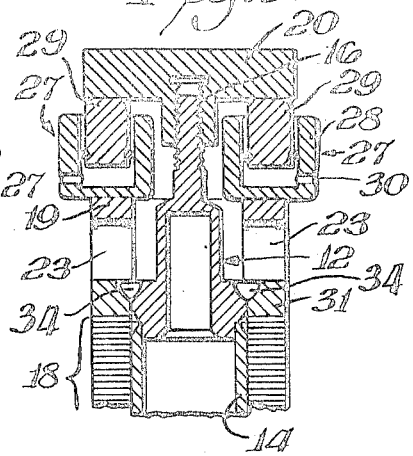
Figure 2:
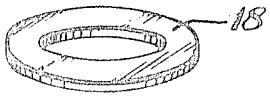
Figure 3:
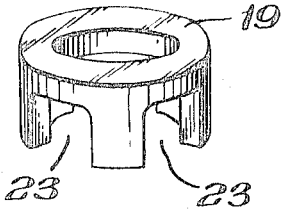
Figure 6:
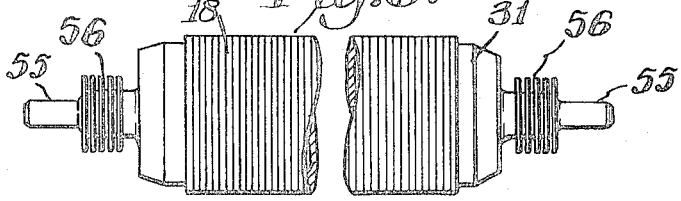
Figure 7:
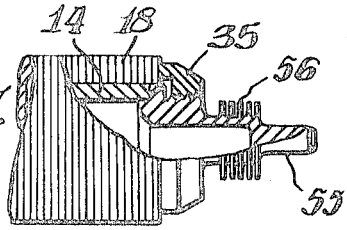
Figure 8:
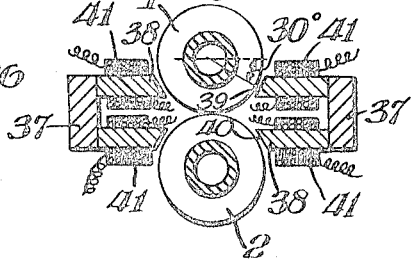
Figure 9:
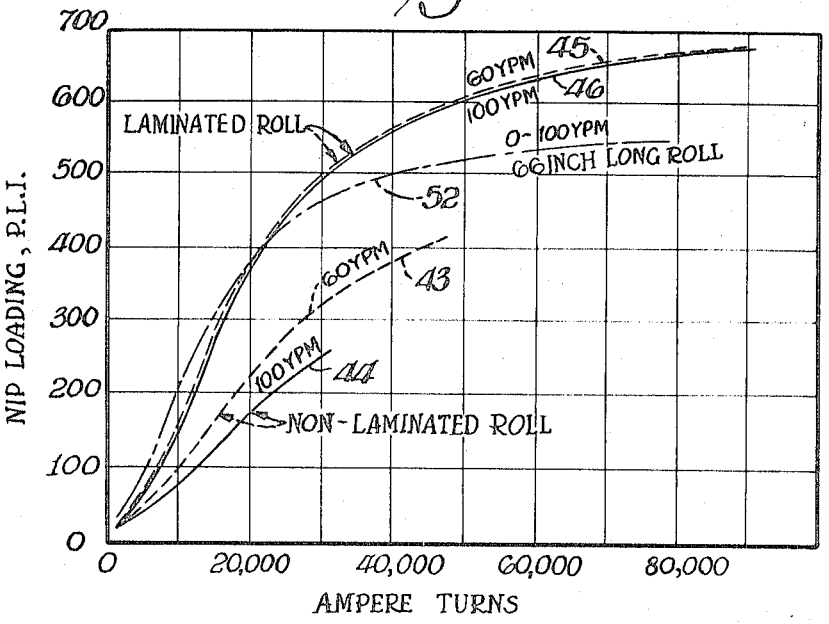
Figure 10:
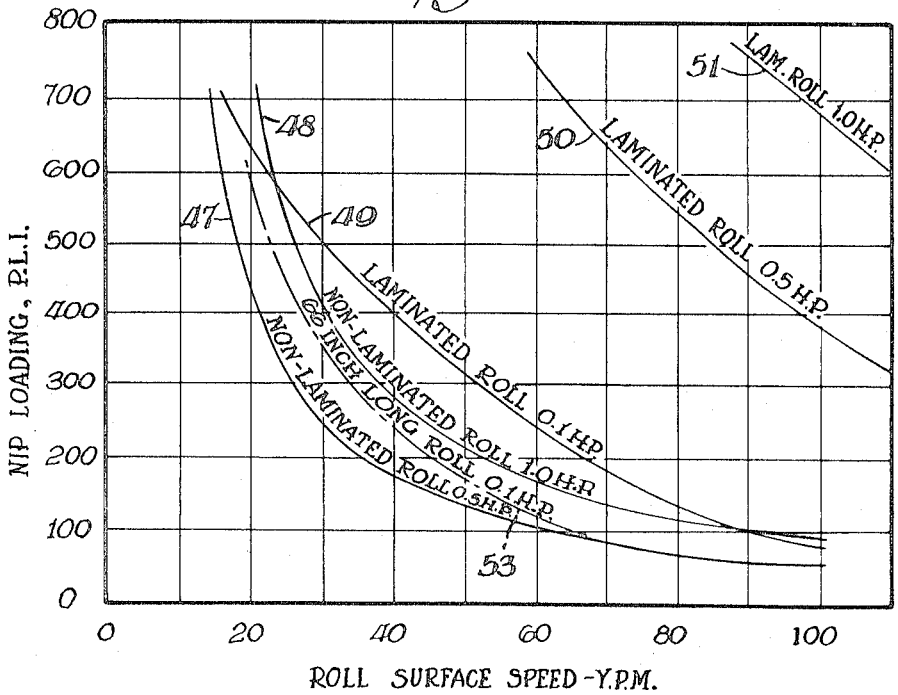

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 23, 1971

892 O.G. 1212

T892,013
PROCESS OF MAKING LAMINATED ROLL

Donald William Edwards, 13 Breeze Hill Road, Wilmington, Del. 19807

Filed Jan. 5, 1971, Ser. No. 104,025
Int. Cl. B21d *53/12;* B21h *1/12, 1/14*
U.S. Cl. 29—148.4
2 Sheets Drawing. 24 Pages Specification

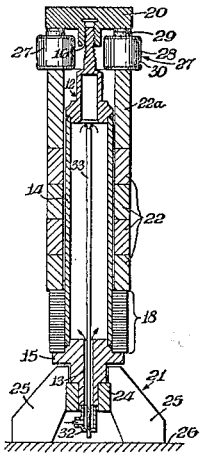

A method of making a laminated roll for use in magnetic calenders wherein the roll includes a plurality of annular laminations installed on a concentric core under particular loading conditions which confer a stiffness that prevents lamination separation in service. The method includes the steps of assembling the laminations in abutment with one another concentrically on a metallic core having a stop on one end and applying an axially directed compressive force to the laminations concurrently with a substantially equal but opposed axially directed tensile force to the core. The loading force applied is equal to about twice the level of loading at which it is desired to permanently preload the laminated roll. The laminations after being placed on the core are permanently locked in place under the compressive and tensile forces applied during assembly of the roll.

Nov. 23, 1971 D. W. EDWARDS T892,013

PROCESS OF MAKING LAMINATED ROLL

Filed Jan. 5, 1971 2 Sheets-Sheet 1

PROCESS OF MAKING LAMINATED ROLL

Filed Jan. 5, 1971 2 Sheets-Sheet 2